April 25, 1967  W. L. HEINZ  3,315,375
TEACHING SYSTEM

Filed May 19, 1964  2 Sheets-Sheet 1

Inventor
William L. Heinz
By Merriam, Smith & Marshall
Attorneys

April 25, 1967   W. L. HEINZ   3,315,375
TEACHING SYSTEM
Filed May 19, 1964   2 Sheets-Sheet 2

Inventor
William L. Heinz
By Merriam, Smith & Marshall
Attorneys

United States Patent Office 3,315,375
Patented Apr. 25, 1967

3,315,375
TEACHING SYSTEM
William L. Heinz, Spring Lake, Mich. (Crocker Citizens Bank Bldg., Suite 744, Riverside, Calif. 92501)
Filed May 19, 1964, Ser. No. 368,528
4 Claims. (Cl. 35—35)

This invention relates to an apparatus for use as a teaching aid in an integrated teaching system. It is more particularly concerned with a carrel for use in an audio teaching system.

The effectiveness of teachers in the educational curriculum can be enhanced and augmented, classroom space employed more effectively, and academic achievement improved by the use of various educational aids which are currently available. Closed circuit television and educational television channels afford audio-visual opportunities. Visual aids are available for use in specialized fields such as the sciences where visual demonstrations are effective in emphasizing certain physical or chemical principles. Supplementing the visual and audio-visual equipment is audio equipment such as tape recorders, radios, phonographs and the like. Audio equipment has many applications in the teaching of languages, speech correction, remedial reading, programmed learning, the recording of notes from live lectures and others where the student can learn by listening and repetitive drilling.

The usefulness of audio-visual and audio apparatus is increased when incorporated into integrated teaching systems. In such systems a teacher control station or audio source is employed to transmit intelligence, either by the teacher's voice or by means of a pre-recorded tape, record player, radio or the like, which is transmitted by means of suitable transmitting system. Preferably the signal is sent by a radio transmitter to a student station where the intelligence is received by suitable audio receiving means. Because a plurality of student stations are located within an enclosed space such as a classroom or library in relatively close proximity each to the other, each student station should have provisions for acoustically isolating each of the stations from adjoining ones. It is further desirable that the student station contain all of the equipment which is necessary for learning by listening, by listening and responding, or by listening, responding and recording the instruction which is received. Audio equipment which is currently available does not provide a single unit which affords the desired acoustical isolation as well as providing in a compact unit all of the accessories necessary for taking full advantage of audio equipment for educational purposes.

According to this invention, there is provided a carrel which folds compactly into a suitable carrying case, which carrying case also contains all of the electronic receiving elements necessary for using the audio equipment in all of the many applications in which audio teaching systems have been found useful.

Referring to the drawings.

In using the carrel of this invention in an audio teaching system, a plurality of student stations 10 are provided within a suitable enclosed space such as a classroom 11. The instructions which are to be given to the students are transmitted by a suitable teacher control station 12. In the place of "live" instructions, pre-recorded instructions are placed on tape or phonographs, or instruction received by radio can also be employed. Suitable provisions are made at the teacher control station 12 whereby this intelligence can be transmitted to the individual student stations disposed about the room. It is preferred that transmissions sent from the teacher control station 12 be sent by radio transmission, thereby avoiding the use of a network of electrical connections directly connecting each of the student stations 10 with the teacher control station 12. Suitable low powered radio transmission equipment is commercially available for use in teaching systems. It is preferred that a radio transmitter be utilized which employs a power sufficiently low that the teacher or operator of the teacher control system does not have to be licensed by the Federal Communications Commission or, in the event that such a license is necessary, that it be one which can be obtained with a minimum of requirements. Desired transmitter characteristics are set forth in part 15 of the FCC rules and regulations.

Figure 1:
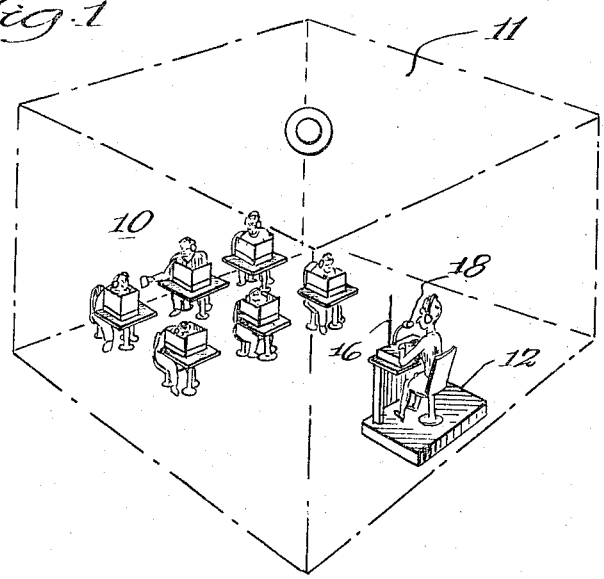
FIGURE 1 is an illustrative representation of an audio teaching system showing the teacher control station or audio source as well as the plurality of closely spaced student stations.
Figure 2:
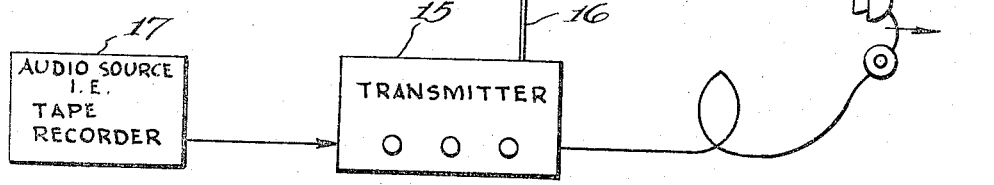
FIGURE 2 is a schematic illustration of the preferred transmitting apparatus utilized at the teacher control station.

A preferred arrangement for a teacher control station is shown in FIGURE 2. The transmitter 15 is a low wattage unit which employs antenna 16 as the transmitting means. A suitable audio source 17, such as a tape recorder, radio or the like, is electrically connected to transmitter 15 to provide the input signal which is sent out from the teacher control station, and overriding microphone 18 is also utilized for injecting live comments or instructions during the transmission of the source material or for the direct transmission of source material from the teacher.

Figure 3:
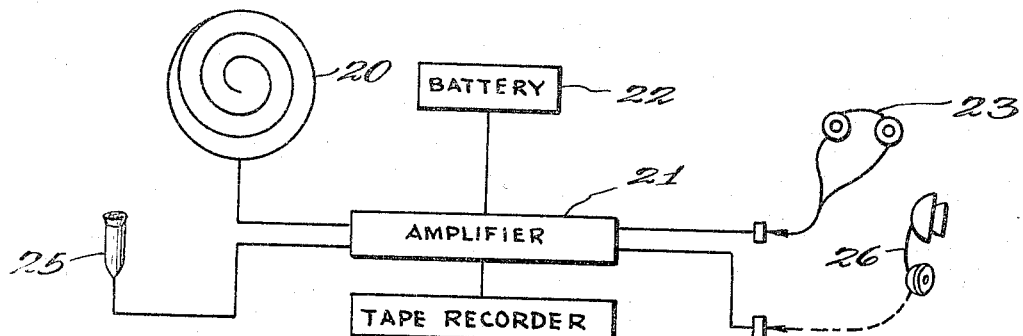
FIGURE 3 illustrates schematically the type of receiving equipment which is included in the carrel of this invention for use in audio learning.

The electronic arrangement located at the student station 10 is shown in FIGURE 3. In the illustrative embodiment, the signal which is transmitted from the teacher control station 12 is received by pickup loop 20, and amplified by a suitable battery-powered amplifier 21 powered by battery 22. The amplified signal is then sent to the earphone set 23 and is also made available for recording by means of tape recorder 24, which is also connected to the output of amplifier 21. A microphone 25 is also provided for use by the student during the responding phase of the selected teaching program. A phone jack is also provided at the carrel in order to permit the teacher to plug in a separate headset 26 for use in monitoring the teaching program. The components of the apparatus at the student station 10 are conventional electronic equipment as is the equipment at the teacher control station 12 such as the transmitter unit, which contains volume and mixer controls to match input and output levels, and the audio source.

Figure 5:
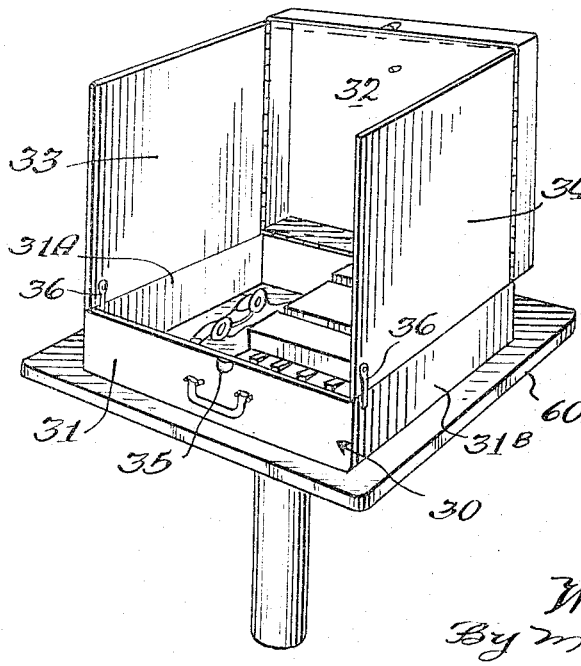
FIGURE 5 is an isometric view of the carrel of this invention opened into the position in which it is used as a teaching aid.
Figure 6:
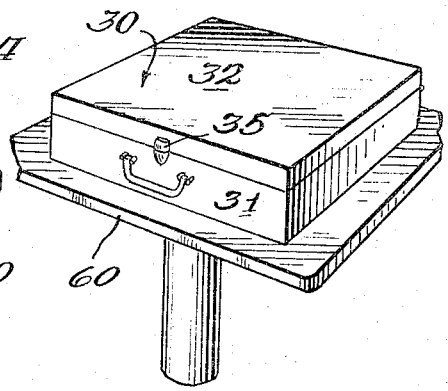
FIGURE 6 is an illustrative embodiment of the carrel in a closed position for storage or transporting.

The electronic components used at the student station are incorporated into a suitable carrying case which, when opened, functions as a carrel for providing an acoustically isolated student station. In FIGURES 5 and 6 are respectively shown the carrying case of this invention in the open position ready for use and the closed position which is used for storage or for carrying the student station home or elsewhere for extra curricular use of the student unit. In the illustrative embodiment the carrel 30 consists of a case 31 having a hinged lid 32. The case used in this embodiment is a conventional attache case; however the size and configuration of the case depends upon the service in which the carrel is to be employed. Preferably, however, the case should be small and light enough to be portable, yet large enough to include all of the electronic components needed for the student station, as well as the acoustical elements which will hereinafter be more fully discussed. In general, it has been found that the so-called attache case provides ample room for all of the components to be included within the case. Standard size attache cases having a case size 17¾" x 12" x 4½" provide adequate room for containing the components of the carrel of this invention.

Acoustical integrity is provided at the carrel by providing a pair of hinged panels 33 and 34 which are attached to the opposed marginal sides of lid 32 in such a manner as to permit panels 33 and 34 to swing inwardly into an overlapping position to allow the cover 32 to be closed on case 31 and locked in the closed position by means of a suitable lock 35. The inner faces of panels 33 and 34 are acoustically treated by employing conventional perforated acoustical tile or some other surface treatment which will acoustically isolate each carrel from adjoining student stations. When the carrel is open, panels 33 and 34 rest on the opposed sides 31A and 31B of case 31. Suitable means are provided for holding the panels 33 and 34 in position on sides 31A and 31B such as latches 36.

Figure 4:
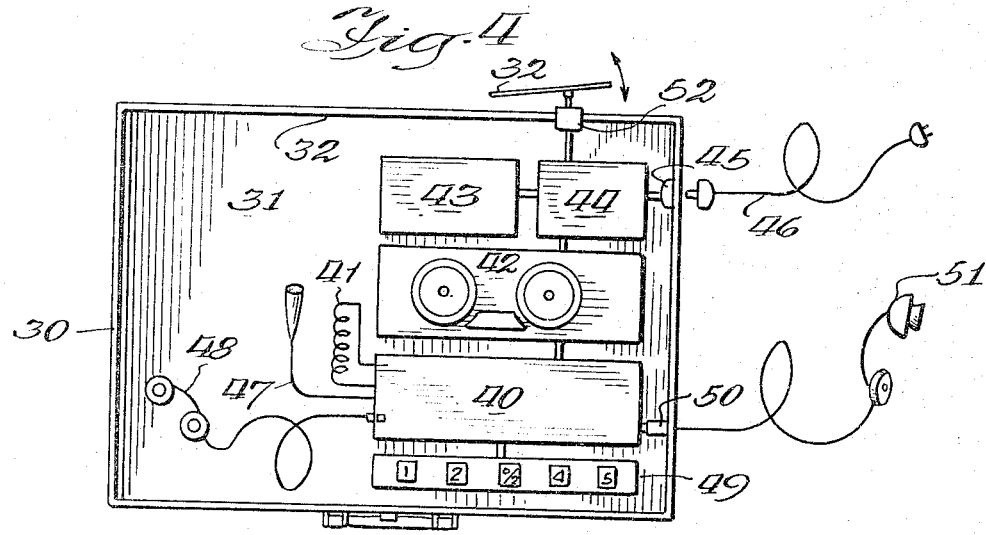
FIGURE 4 is an enlarged plan view showing the interior of the carrel, illustrating the disposition of the various electronic equipment which is utilized at the student station.

Disposed within the interior of case 31 are the electronic components of the carrel 30. Referring to FIGURE 4 there is shown schematically an arrangement of components whereby the student has complete use and selection of the audio functions such as listen, respond, tape playback and tape recording of both the lesson as broadcast by the teacher station transmitter and response to the lesson by the student, the response being confined to being recorded on the tape recorder unit 42 of the carrel 30. The electronic components consist of a receiver and amplifier unit 40. A pickup antenna loop 41 is also mounted within the case and can be attached to one of the sides or installed in a concealed manner in the bottom of the case. A tape recorder unit 42 is electrically coupled to the receiver-amplifier unit 40. Power for the electrical unit is provided by a battery pack 43, to which is connected a battery charger 44. A convenience outlet 45 is provided in side wall 31B of case 31, in order to permit the battery charger 44 to be electrically connected by means of electrical line 46 to a convenient source of electrical power (not shown). A microphone 47 and a student earphone headset 48 complete the electrical components of the carrel. The microphone 47 and earphone headset 48 are electrically connected to the receiver amplifier 40 in order to receive the transmissions from the teacher control station 12 or audio source as well as any playback from the tape recorder 42 which is included as part of the carrel. The microphone 47 is electrically connected in the circuit such that the student can personally use it for imitative drills or for other responses or note taking which the student may wish to make during the course of the instructions.

Control of the electrical components of the carrel is effected by means of switch panel 49, which has a plurality of individual electrical switches to control the operation of the tape recorder unit 42, such as winding and re-winding, dictate and listen, volume off-on, etc. A microphone jack 50 is also mounted in the side wall 31B of case 31 to permit the connection of a separate headset 51, which is employed by the teacher for monitoring the program being transmitted from the teacher station, as well as any responses which the student may wish to record on the recorder unit 42. Off-on switch 52 is mounted in the back wall 31C of case 31 and is provided with a spring-loaded plunger which is manipulated by the opening or closing of the cover 32, such that the electrical circuit is not energized when the cover is closed for transportation of the student station.

In use in a teaching system, the carrel 30 is placed upon a suitable platform 60 at the student station 10. After opening the cover 32, the panels 33 and 34 are locked in position on the edges of sidewalls 31A and 31B of case 31. The audio source at the teacher station 12 is energized and intelligence transmitted to the individual student stations 10 located about the room 11. The intelligence is received by the student through the earphone headset 48. The tape recorder can be operated at any time during the instruction period to function as a duplicator of the transmission which is being sent out by the audio source at the teacher control station 12, as well as other uses pointed out above. With the integrated teacher's monitoring system provided by headset 51, the teacher can tutor the student, make corrections and the like while the student is responding into the microphone 47 and recorder 42. Furthermore, the comments of the teacher and the advice given are directly recorded on the tape recorder 42. The teacher, through use of the headset 51, can review the lesson which has been transmitted, with both the student and the teacher listening together by rewinding the tape on tape recorder 42 and playing back the information which has been put on the tape.

The flexiblity of the combination of electronic components provides a carrel for use in an audio learning system wherein the amplifier provides functions for all of the applications in which the carrel can be employed, namely, responding, listening, monitoring by the teacher and recording. All of the units necessary for use of the carrel in an audio teaching system are self-contained within the case, which also serves as a means for transporting the student station from place to place, as the need requires.

Although the subject invention has been illustrated and described with respect to an illustrative specific embodiment thereof, it is to be understood that many variations and modifications will be obvious to those who are skilled in the art to which this invention pertains. The electrical components which are employed can be conventional units commercially available, or can be custom-made to facilitate their installation in the carrying case 31. Conventional electrical and electronic circuitry is employed in the design of the transmitter unit employed at the teacher station or in the receiver-amplifier used at the student station. While low wattage transmitters employing a whip antenna located at the transmitter are preferred, the carrel of this invention can also be utilized in audio teaching systems wherein transmission from the audio source is effected by means of a loop antenna encircling a classroom. The electrical components can be acquired from commercial sources or can be custom-manufactured, depending upon the economics of design and manufacturing of the finished unit. Power can be supplied by a battery or directly from a line source of electrical power if desired. The preferred carrel is designed to be portable. However, the feature of this invention can be incorporated in desk units permanently located at the student station. The panels which are used to provide acoustic integrity can be attached to the case or lid by any suitable means, and acoustical treatment can also be given to the lid element.

While the standard components of the carrel of this invention are as hereinbefore set forth, the arrangement of the components within the carrying case or the use of supplemental electrical components other than those set forth above will also be apparent to the skilled worker in the art to which this invention pertains. Accordingly, it is intended that this invention be limited only in the manner set forth in the appended claims.

I claim as my invention:

1. A portable carrel for use in audio teaching systems which comprises a base storage case having opposed side walls, a lid for said case, said lid having a pair of opposed parallel edges, means for locking said lid to said case in a closed position, means for mounting said lid normal to said case along respective cooperative marginal edges thereof in an open position, a pair of acoustical panels, each of said pair of panels being adapted to be mounted respectively along one edge thereof to said opposed parallel edges substantially normal to said lid when said lid is in the open position, the vis-a-vis faces of said panels being acoustically treated to provide an acoustical chamber therebetween, said storage case containing electronic receiving and recording equipment comprising a receiver means for receiving a radio signal, amplifier means for said radio signal, a microphone means for providing an input signal to said amplifier, a tape recorder means electrically connected to said amplifier and adapted for recording said radio signal and said input signal, reproducer means for audibly reproducing the output from said tape recorder, and means for providing power to said electronic circuit.

2. A portable carrel which comprises a rectangular storage case having a planar base member and vertical opposed side walls, a rectangular lid for said case, said lid having the same rectangular configuration as said case and having a pair of opposed parallel edges, means for locking said lid to said case in a closed position, hinge means for mounting said lid normal to said case along respective cooperative marginal edges thereof in an open position, a pair of acoustical panels, each of said pair of panels being hingedly mounted respectively along one edge thereof to said opposed parallel edges substantially normal to said lid when said lid is in the open position, the vis-a-vis faces of said panels being acoustically treated to provide an acoustical chamber therebetween, said storage case containing electronic receiving and recording equipment comprising a receiver means for receiving a radio signal, amplifier means for said radio signal, a microphone means for providing an input signal to said amplifier, a tape recorder means electrically connected to said amplifier and adapted for recording said radio signal and said input signal, reproducer means for audibly reproducing the output from said tape recorder, and means for providing power to said electronic circuit.

3. A carrel in accordance with claim 2 wherein said electronic circuit a rechargeable battery is employed as said power source.

4. In an audio teaching system having a plurality of student stations, a teacher control station including pre-recorded instructions and radio transmission means developing a radio signal for transmitting said instructions to said student stations, the improvement comprising a portable carrel as claimed in claim 1 at each of said student stations wherein said respective receiving and recording equipment receives and records (1) said pre-recorded instructions via said transmitted radio signal, (2) information from the respective student at the station coupled through the respective microphone means, and (3) information from the teacher coupled through the respective amplifier.

References Cited by the Examiner

UNITED STATES PATENTS

| | | | |
|---|---|---|---|
| 292,657 | 1/1884 | Kirkpatrick | 312—241 X |
| 3,069,789 | 12/1962 | Knight et al. | 35—35.3 |
| 3,086,297 | 4/1963 | Kantrowitz | 35—35.3 |
| 3,122,847 | 3/1964 | Redfield et al. | 35—35.3 |
| 3,152,848 | 10/1964 | Kalk. | |

EUGENE R. CAPOZIO, *Primary Examiner.*

JEROME SCHNALL, *Examiner.*

W. GRIEB, *Assistant Examiner.*